(12) United States Patent
Yacucha

(10) Patent No.: US 8,511,951 B2
(45) Date of Patent: Aug. 20, 2013

(54) STRAP HOOK RETAINER

(76) Inventor: Dean Kelly Yacucha, Portage la Prairie (CA)

( * ) Notice: Subject to any disclaimer, the term of this patent is extended or adjusted under 35 U.S.C. 154(b) by 401 days.

(21) Appl. No.: 12/837,008

(22) Filed: Jul. 15, 2010

(65) Prior Publication Data
US 2011/0010897 A1 Jan. 20, 2011

Related U.S. Application Data

(60) Provisional application No. 61/226,769, filed on Jul. 20, 2009.

(51) Int. Cl.
*B60P 7/08* (2006.01)
*F16B 45/00* (2006.01)

(52) U.S. Cl.
USPC ............................... 410/106; 24/265 H

(58) Field of Classification Search
USPC .............. 410/104, 106, 100, 102, 105, 110, 410/115, 116
See application file for complete search history.

(56) References Cited

U.S. PATENT DOCUMENTS

| | | | | |
|---|---|---|---|---|
| 5,193,955 A | * | 3/1993 | Chou | 410/100 |
| 5,288,003 A | * | 2/1994 | MacDonald | 224/328 |
| 5,388,938 A | | 2/1995 | Helton | |
| 5,807,045 A | * | 9/1998 | Profit | 410/116 |
| 5,809,620 A | * | 9/1998 | Crowley et al. | 24/302 |
| 6,216,322 B1 | * | 4/2001 | Kuo | 24/599.9 |
| 7,090,449 B1 | * | 8/2006 | Hugg | 410/102 |
| 7,458,758 B2 | * | 12/2008 | Adams | 410/104 |
| 7,473,063 B1 | * | 1/2009 | Adams | 410/116 |

* cited by examiner

*Primary Examiner* — Glenn Dayoan
*Assistant Examiner* — Sunsurraye Westbrook
(74) *Attorney, Agent, or Firm* — Ryan W. Dupuis; Kyle R. Satterthwaite; Ade & Company Inc.

(57) ABSTRACT

A strap hook retainer mounted alongside a platform retains the strap hook of a tie down strap for securing cargo onto the platform. In a first embodiment, the strap hook retainer includes a hook opening between an upright retainer flange and a lower flange in which the lower flange portion is offset outwardly in relation to the upright retainer flange portion to define a supporting surface which supports the strap hook when the tie down strap is slack. In a second embodiment, the retainer is mates with a mounting track of the platform such that the base of the retainer is slidable along the track. The strap hook is hooked onto a retainer flange spaced below the base to receive the strap hook therebetween. A stop flange below the retainer flange portion serves to support the strap hook when the tie down strap is slack in this instance.

19 Claims, 13 Drawing Sheets

STRAP HOOK RETAINER

This application claims the benefit under 35 U.S.C. 119(e) of U.S. provisional application Ser. No. 61/226,769, filed Jul. 20, 2009.

FIELD OF THE INVENTION

The present invention relates to a strap hook retainer arranged to be supported alongside a platform for retaining a strap hook of a cargo tie down strap relative to the platform.

BACKGROUND

A common form of cargo transport involves supporting cargo on the platform of a flat deck trailer to which the cargo is secured using straps which extend over the cargo and which are fastened at opposing ends at spaced apart positions on opposing sides of the platform. A common type of strap comprises a flat textile band supporting a flat strap hook at one end thereof for securement to one side of the platform while the other end is coupled to a suitable winding mechanism to apply tension to the strap extending over the cargo. If there is any slack in the strap however, the hook can readily fall from an engaged position hooked beneath a suitable anchor along the side of the platform so that subsequent tightening of the strap does not necessarily re-engage the hook as the hook becomes misaligned when slack is present in the strap.

U.S. Pat. No. 5,388,938 by Helton discloses a strap hook retainer which retains a strap hook even when there is slack in the strap. This is accomplished by providing a depending retainer flange within a surrounded housing in which a bottom edge of the retainer flange over which the strap hook is retained is pivoted into an in use position in close proximity to a bottom flange of the housing. In this manner the strap hook can only be released by pivoting the retainer flange upwardly and inwardly so as to be sufficiently elevated from the bottom flange to allow passage of the hook therebetween when disengaged from the retainer flange. The configuration of the retainer flange however is very awkward to manipulate due to the pivoting required in the small confines of a surrounding housing. Furthermore the common location of the retainer along the sides of a platform of a transport vehicle commonly results in various debris including road salt and the like which contributes to corrosion and obstructions within the housing of the retainer which prevent ready pivoting of the retainer into a released position. The retainer is thus susceptible to jamming in an inoperable state. Furthermore the hinge design places considerable stress of the tension of the strap on smaller hinge components so that the retainer may be subject to failure under high stress loading conditions.

SUMMARY OF THE INVENTION

According to one aspect of the invention there is provided a strap hook retainer in combination with a strap hook of a tie down strap for use in securing cargo onto a platform wherein the strap hook comprises a U-shaped member having a base portion extending between a strap portion arranged to be mounted on the tie down strap and being mounted at one end of the base portion and a hook portion comprising a free end and being mounted at the other end of the base portion, the strap hook retainer comprising:

a base arranged for securement to the platform;

an upright retainer flange portion which is mounted to the base adjacent a top end of the upright retainer flange portion so as to be fixed in relation to the base, the retainer flange portion extending downwardly from the top end to a bottom retainer edge arranged to be received between the strap portion and the hook portion of the U-shaped member of the strap hook in an engaged position of the strap hook;

a lower flange portion mounted to the base in fixed relation to the base, the lower flange portion comprising a top free edge which is spaced below the bottom retainer edge;

a hook opening having a fixed dimension defined between the bottom retainer edge of the upright retainer flange portion and the top free edge of the lower flange portion and having a height between the bottom retainer edge and the top free edge which is less than a height of the free end of the hook portion from the base portion of the strap hook; and the top free edge of the lower flange portion being offset laterally outwardly away from the base in relation to the bottom retainer edge of the upright retainer flange portion so as to define a supporting surface between the top free edge of the lower flange portion and the base which is arranged to support the base portion of the strap hook thereon when the tie down strap is slack.

By providing a strap hook retainer comprising an upright retainer flange and a lower flange portion therebelow which remain fixed relatively to the housing, a stronger and more maintenance free design of strap hook retainer is provided while maintaining all the benefits of retaining a strap hook therein even when slack is provided in the strap. The strap hook is effectively retained by arranging the hook opening to have a dimension which is less than the height of the hook portion so that even when the base of the hook is supported adjacent the lower flange portion when there is slack in the strap, the free end of the hook remains engaged at the inner side of the upright retainer flange above the retainer edge thereof. By offsetting the lower flange portion laterally outwardly relative to the retainer flange thereabove, when slack is provided in the strap, the base of the strap hook will tend to remain engaged between the lower flange portion and the base when it falls from the upright retainer flange thereabove. By further arranging the hook opening to be near in dimension but slightly less than the height of the hook portion of strap hook, there remains sufficient space to readily disengage the strap hook from the strap hook retainer when desired without requiring an additional pivoting mechanism to do so as described in the prior art.

Preferably the height of the hook opening between the bottom retainer edge of the top free edge is near to a height of the free end of the hook portion from the base portion of the strap hook such that the free end of the hook portion is in close proximity to the bottom retainer edge when the base portion is supported on the supporting surface between the top free edge of the lower flange portion and the base when the tie down strap is slack.

Preferably the upright retainer flange portion and the lower flange portion are joined by side portions along opposing sides of the hook opening in which the retainer flange portion, the lower flange portion and the side portions comprise an integral and continuous plate of material locating the hook opening therein. The side portions may be sloped at an outward and downward inclination from the bottom retainer edge of the retainer flange portion to the top free edge of the lower flange portion.

Preferably a horizontal distance of the offset of the top free edge of the lower flange portion relative to the bottom retainer edge of the retainer flange portion is less than a minimum distance between the free end and the strap portion of the strap hook.

When the lower flange portion is upright in orientation, preferably there is provided a bottom flange spanning between the lower flange portion and the base which defines the supporting surface upon which the base portion of the strap hook is arranged to be supported when the tie down strap is slack. The bottom flange may be spaced below the top free edge of the lower flange portion. A height between the bottom retainer edge and the bottom flange is preferably less than the height of the free end of the hook portion from the base portion of the strap hook.

Preferably the base comprises a vertical plate member including mounting apertures arranged to receive mounting fasteners therethrough.

Preferably there is provided a top flange spanning between the top end of the retainer flange portion and the base at a location spaced upwardly from the bottom retainer edge of the retainer flange portion by a distance which is greater than the height of the free end of the hook portion from the base portion of the strap hook.

According to a second aspect of the present invention there is provided a strap hook retainer in combination with a strap hook of a tie down strap for use in securing cargo onto a platform comprising a track extending alongside the platform wherein the strap hook comprises a U-shaped member having a base portion extending between a strap portion arranged to be mounted on the tie down strap and being mounted at one end of the base portion and a hook portion comprising a free end and being mounted at the other end of the base portion, the strap hook retainer comprising:

a base comprising guides arranged for mating connection with the track such that the base is slidable along the track;

a retainer flange portion mounted in fixed relation to the base at a location spaced below the guides of the base, the retainer flange spanning laterally inwardly from an outer edge to an inner retainer edge arranged to be received between the strap portion and the hook portion of the U-shaped member of the strap hook in an engaged position of the strap hook;

the outer edge being spaced below the guides of the base so as to define a strap opening arranged to receive the U-shaped strap hook inserted therethrough between the retainer flange portion and the guides from the outer edge to the inner retainer edge of the retainer flange portion; and a stop flange portion mounted in fixed relation to the base at a location spaced below the guides and spaced inwardly from the inner retainer edge so as to define a hook opening between the stop flange portion and the inner retainer edge of the retainer flange portion arranged to receive the hook portion of the strap hook extending downwardly therethrough in the engaged position of the strap hook.

By providing a retainer flange portion which is spaced below the guides received in the track to define a strap opening which receives the strap hook therethrough from the outer side to the hook opening, the strap hook can be inserted between the retainer flange portion and the track within which the retainer is received thereabove so that the hook portion of the strap hook extends downwardly into the hook portion. In this method any slack in the strap results in the strap hook remaining being supported in alignment with the hook opening so that subsequent tightening returns the hook to the engaged position without any further realignment of the strap hook being required. By further providing a stop flange portion with which the base of the strap hook is arranged to be engaged by locating the stop flange portion spaced inwardly from the retainer edge of the hook opening, the user is further ensured that the strap hook remains in a position ready for engagement even when there is slack in the strap of the strap hook.

Preferably the hook opening has a dimension between the inner retainer edge of the retainer flange portion and the stop flange portion which is less than a height of the free end of the hook portion from the base portion of the strap hook.

Preferably the retainer flange portion comprises a plate member locating an aperture therein which defines the hook opening in which an outer edge of the aperture defines the inner retainer edge of the retainer flange portion and an opposing inner edge of the aperture supporting the stop flange portion thereon.

The stop flange portion is preferably integrally and continuously formed with the retainer flange portion from the plate member. The stop flange portion may extend downwardly and forwardly from the inner edge of the aperture defining the hook opening.

There may be provided a pair of end walls extending upwardly from opposing ends of the retainer flange portion to a top end mounted on the guides of the base respectively. The retainer flange portion, the stop flange portion and the pair of end walls preferably comprise an integral unitary body formed as a continuous and bent sheet of material. The guides are preferably integrally formed from the sheet of material as a unitary body together with the retainer flange portion, the stop flange portion and the pair of end walls.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
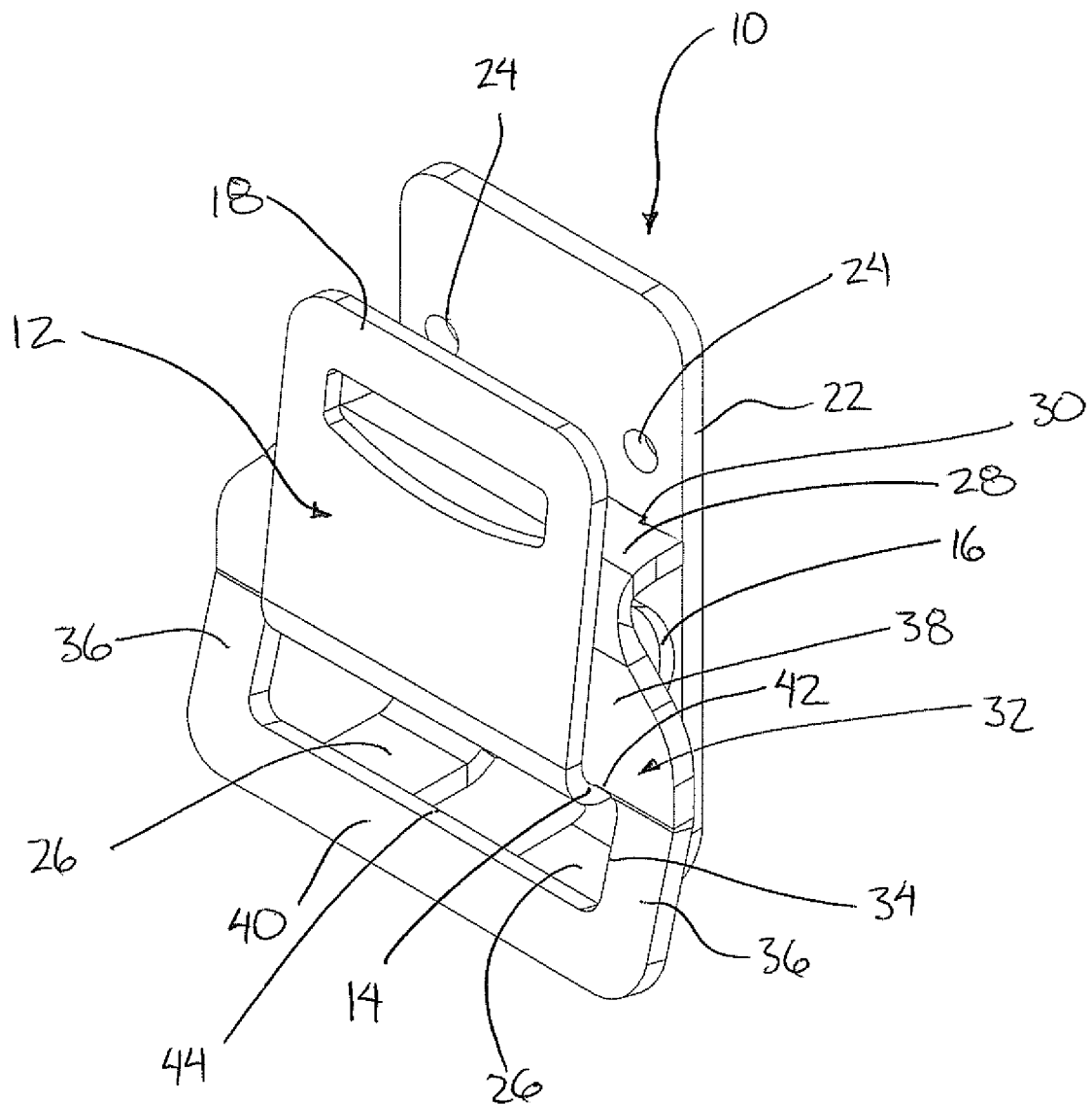
FIG. 1 is a perspective view of a first embodiment of the strap hook retainer supporting a strap hook therein.

Referring to the accompanying figures there is illustrated a strap hook retainer generally indicated by reference numeral 10. The retainer is particularly suited for use in retaining a strap hook 12 of the type commonly used with a flat textile strap for securing cargo to a platform for example a flat deck trailer. In the instance of a trailer, a plurality of winches or other suitable winding mechanisms are provided along one side of the deck trailer for coupling respective first ends of the textile straps. The strap hook 12 is mounted at the second end of each strap for anchoring to the opposing side of the trailer platform. By extending the strap over the cargo and tensioning the strap using the winding mechanisms, the cargo is effectively secured to the platform.

A typical strap hook 12 comprises a generally U-shaped member having a base portion 14 extending between a hook portion 16 at one end of the base portion and a strap portion 18 at the other end of the base portion. The hook portion extends from the base portion to a free end of the hook which engages over a portion of the retainer 10 to retainer the strap hook in an engaged position. The strap portion 18 extends from the other end of the base portion 14 and includes a suitable strap aperture therein for receiving a portion of the strap for anchoring the strap portion relative to the strap.

Figure 2:
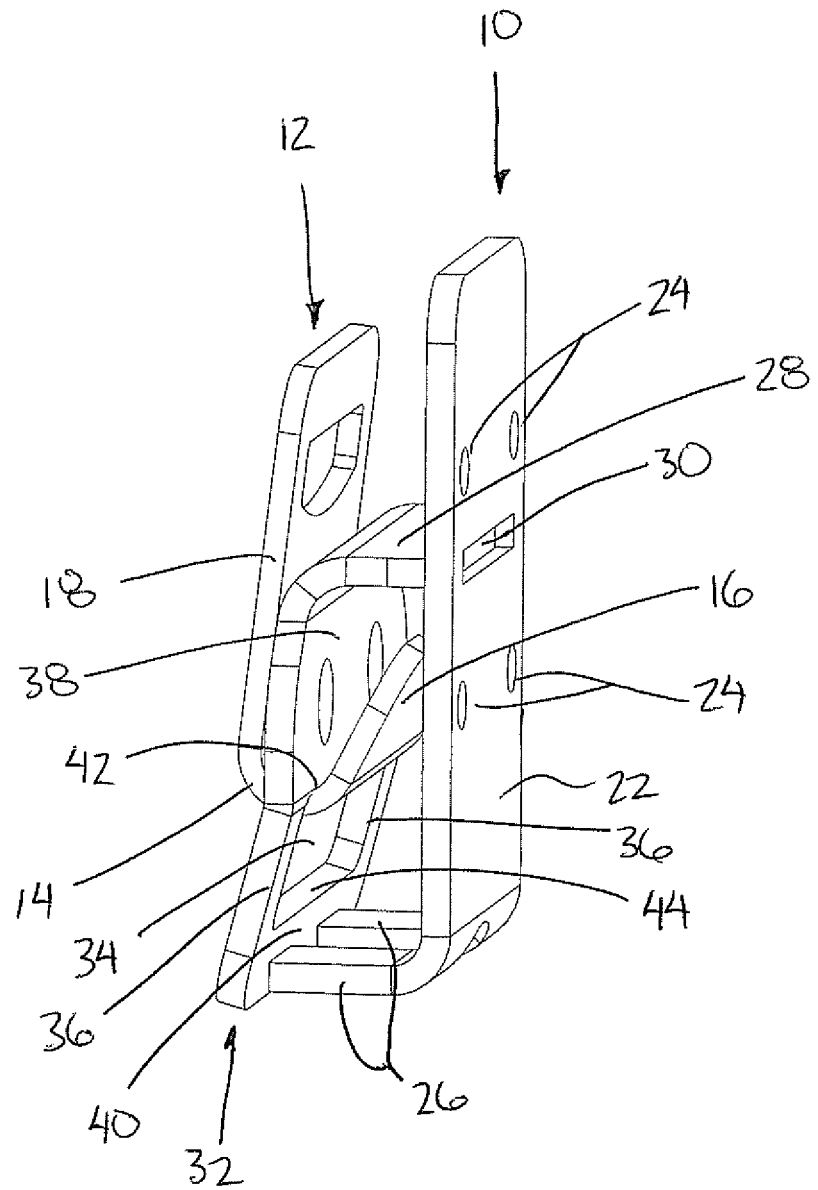
FIG. 2 is a perspective view of an inner side of the base of the strap hook retainer according to FIG. 1.
Figure 3:
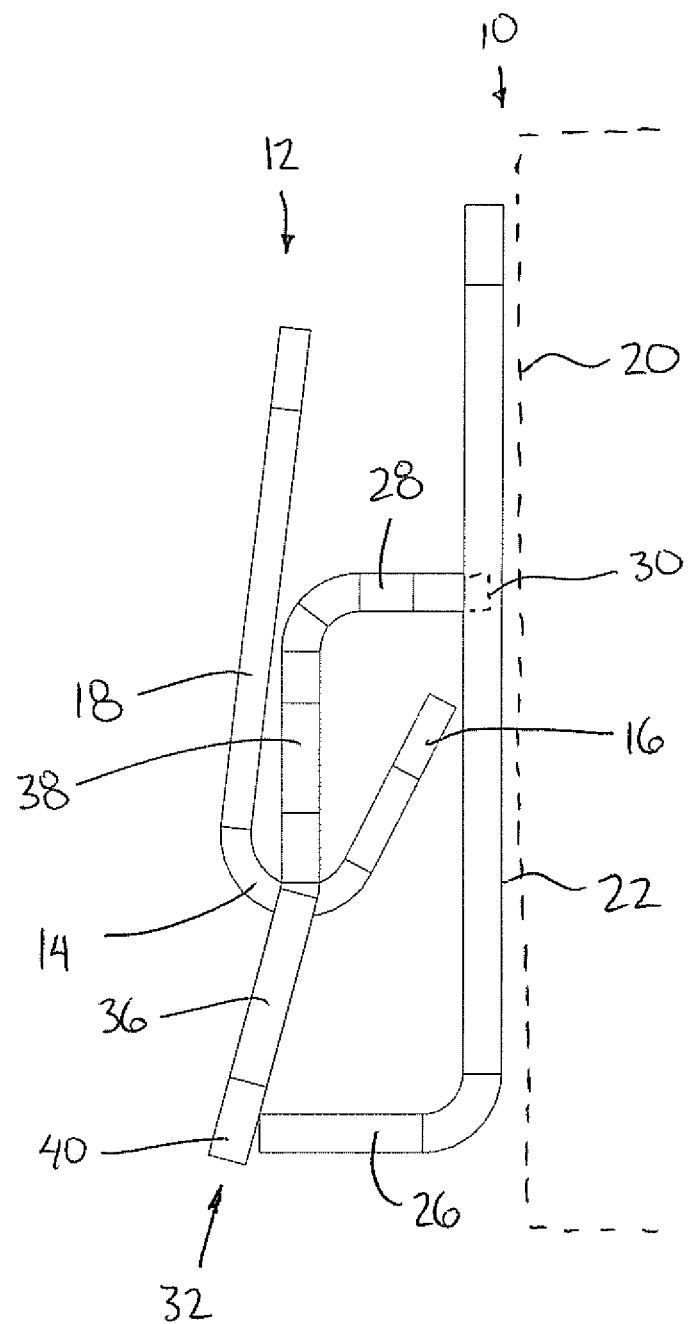
FIG. 3 is an end elevational view.
Figure 4:
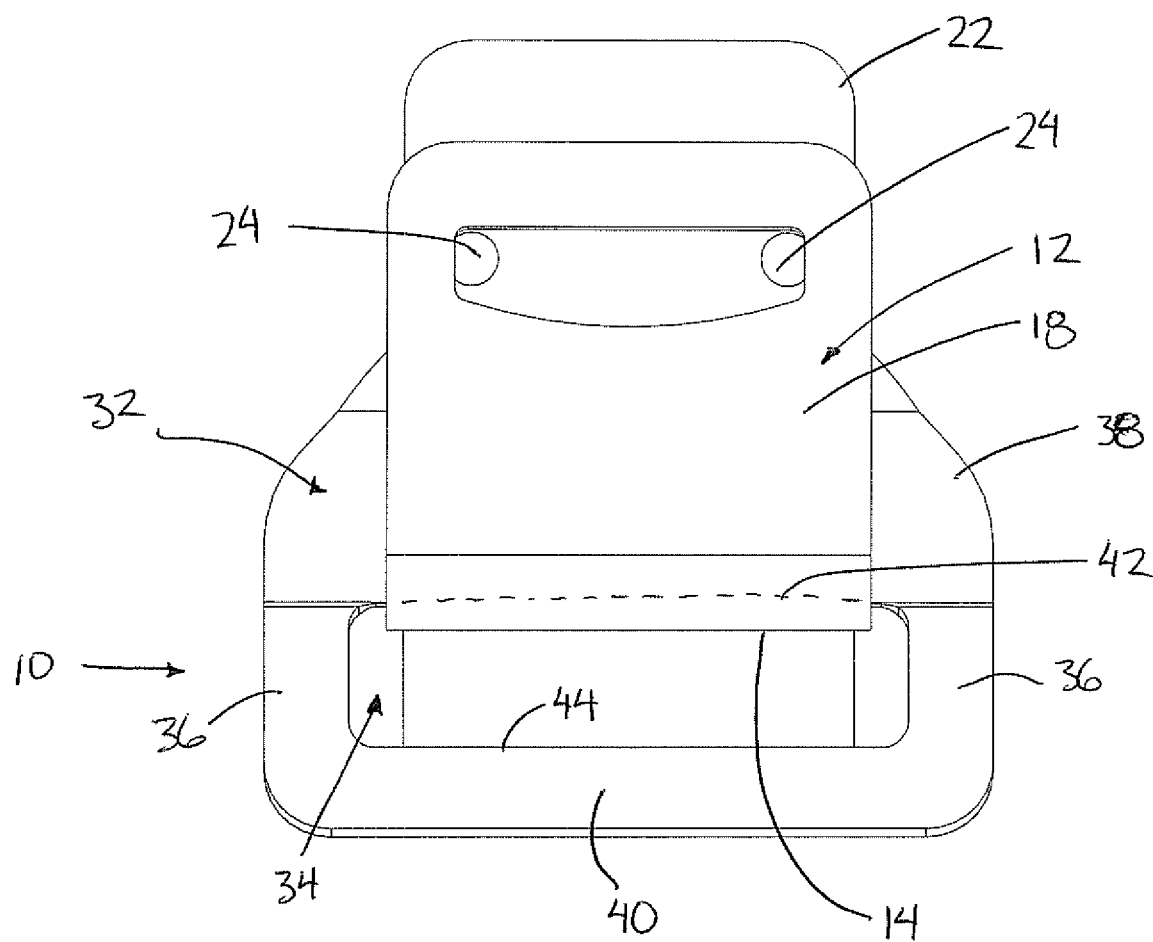
FIG. 4 is an outer side elevational view and FIG. 5 is an inner side elevational view of the strap hook retainer supporting a strap hook therein according to the embodiment of FIG. 1.
Figure 5:
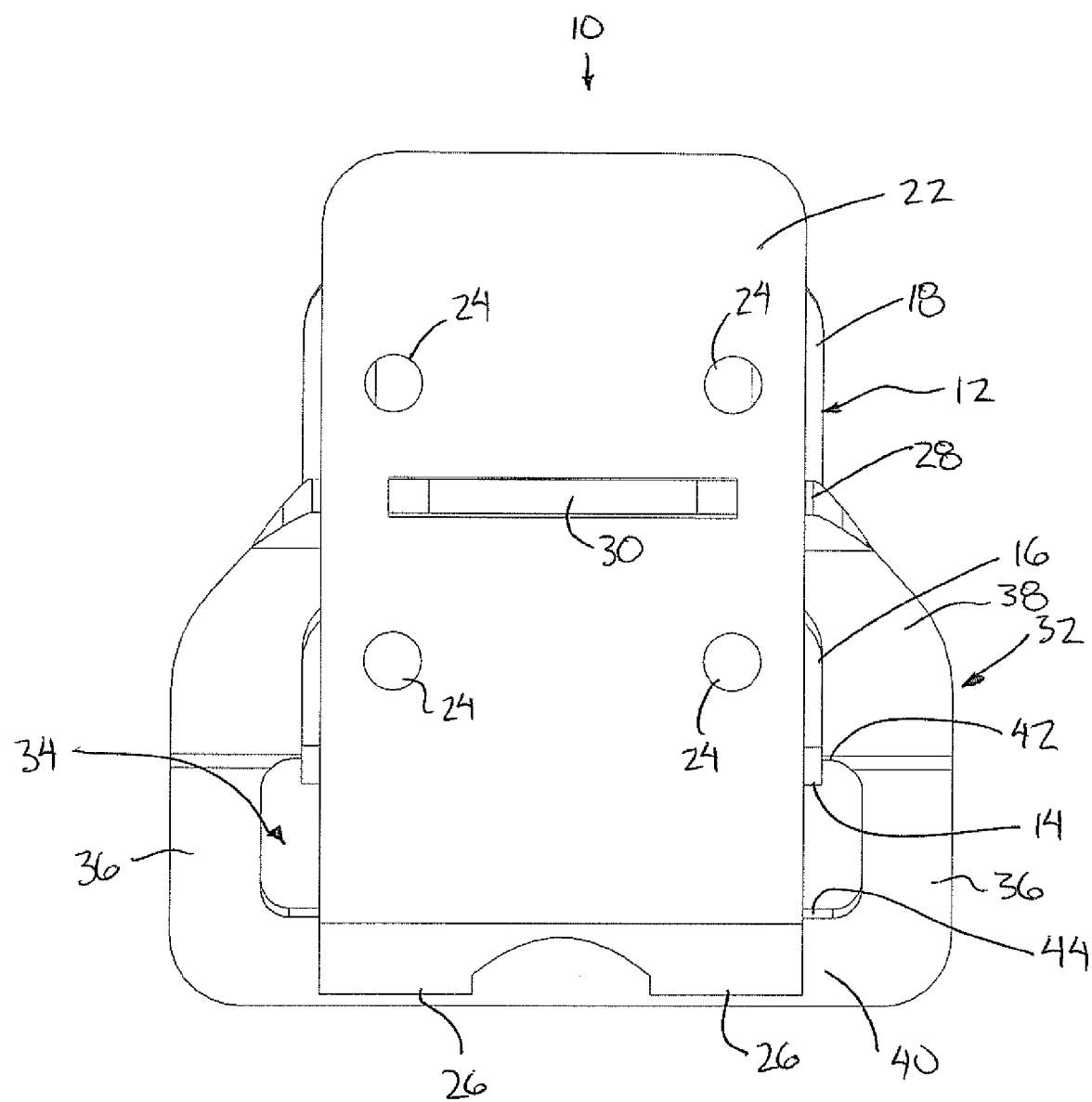
Figure 6:
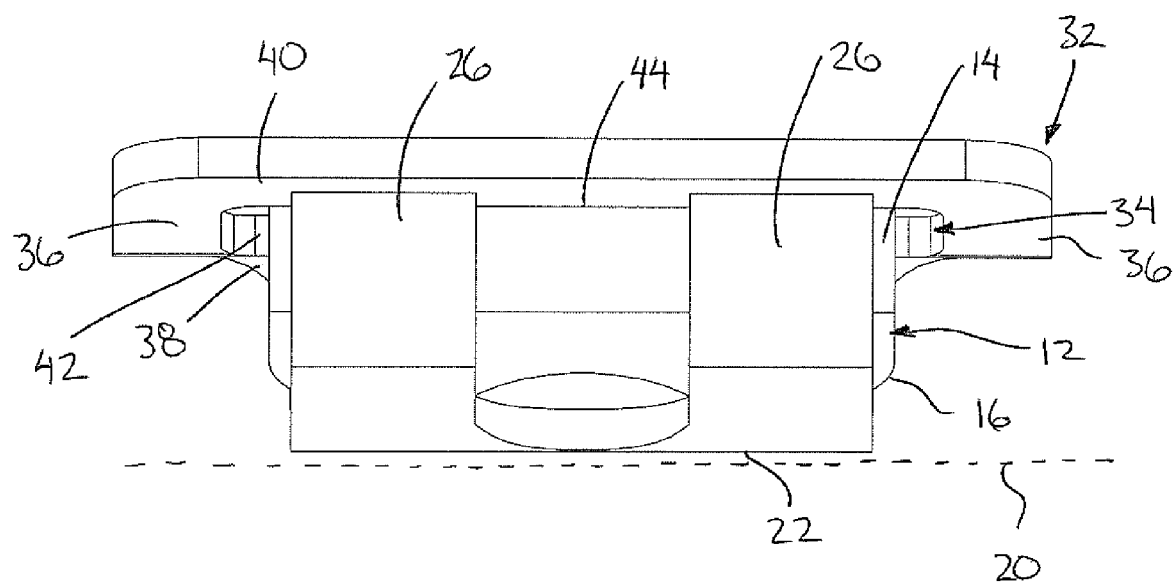
FIG. 6 is a bottom plan view of the retainer according to FIG. 1 with the strap hook shown supported therein.

Referring initially to FIGS. 1 through 6, a first embodiment of the retainer 10 is illustrated for use with a platform of the type comprising an upright side wall 20 extending along the length of the platform to which the retainer 10 can be fastened. The retainer in this instance comprises a base 22 in the form of a vertical plate with suitable mounting apertures 24 formed therein to receive fasteners which fasten the plate to the upright side wall 20 of the platform. Two of the apertures 24 are provided laterally spaced apart from one another nearer to the top end than the bottom end of the base. Two other apertures 24 are provided laterally spaced apart from one another closer to the center of the plate between the top and bottom edges thereof.

The base 22 further comprises two bottom flanges 26 formed integrally and continuously from a unitary sheet of material with the vertical base plate 22 in which the two bottom flanges 26 extend outwardly from the bottom end of the base plate to be oriented generally horizontally and perpendicularly to the vertical base. The two bottom flanges 26 are generally coplanar and laterally spaced apart from one another.

In alternative embodiments, the two bottom flanges 26 may comprise a single integral sheet of material to provide greater structural support.

The retainer 10 further comprises a top flange 28 which is mounted on the base 22 at a location spaced evenly in the vertical direction between the two sets of apertures 24 so as to be spaced upwardly above the bottom flange 26 while also being spaced downwardly from the top edge of the plate near to a vertical center of the plate.

The base plate includes a horizontally extending slot extending through the plate at the mounting location of the top flange which is spaced inwardly from both side edges of the plate. A suitable mating tab 30 is formed at the inner end of the top flange 28 for insertion into the slot in the base plate for ease of alignment of the top flange with the base plate prior to welding the top flange in fixed relation to the base plate during manufacturing.

The top flange is integral with an outer plate member 32 such that the outer plate member is a continuous unitary body with the top flange formed of a continuous sheet of material which has been bent to define the top flange and the plate member. The plate member 32 extends downwardly from a top end depending from the top flange at a location spaced outwardly from the base plate to a bottom end of the plate member 32 which is fixed by welded connection to the outer ends of the bottom flanges at a location spaced farther outward from the base than the top end of the plate member due to the top flange being shorter in horizontal dimension between the base plate and the outer plate member 32 than the bottom flanges therebelow. In this manner the bottom end of the outer plate member 32 is offset laterally outwardly from the base plate relative to the top end thereof.

A hook opening 34 is formed in the plate member 32 in the form of an aperture which is laterally centered between opposing side edges of the plate member while being positioned nearer to the bottom flanges than the top flange. The width of the hook opening 34 between opposed upright edges of the opening is fixed to be close to but slightly greater than the dimensions of the strap hook between opposed U-shaped edges thereof. The top flange, the base plate, and the overall width between outer edges of the bottom flanges are arranged to all be similar in dimension to the width of the strap hook between the opposed U-shaped edges thereof such that the lower portion of the outer plate member 32 is increased in width at the location of the hook opening 34 so that two side portions 36 of the plate member are defined along opposing sides of the hook opening which are substantially coplanar with one another and which define the opposing upright edges of the hook opening 34 therebetween. The two side portions 36 are sloped downwardly and outwardly from a substantially vertical retainer flange portion 38 of the plate member 32 thereabove and a lower flange portion 40 of the plate member 32 therebelow.

The upright retainer flange portion of the outer plate member 32 extends generally vertically downward from a top end joined to the top flange spaced outwardly from the base to a bottom retainer edge 42 which defines the top edge of the hook opening 34 in the plate member. The upright retainer flange portion 38 is thus substantially parallel to the base plate spaced outwardly therefrom by a distance which is near to a minimum distance between the free end of the strap hook and the opposing strap portion of the strap hook. The height of the retainer flange 38 between the top flange and the bottom retainer edge 42 is arranged to be slightly greater than the height of the hook portion of the strap hook from the free end to the base portion of the hook so that the hook is arranged to be supported in an engaged position with the upright retainer flange portion 38 by engagement of the bottom retainer edge against the inner side of the base portion of the hook with the hook portion being received between the retainer flange portion and the base of the retainer in use.

The lower flange portion 40 is coplanar with the two side portions 36 to extend downwardly and outwardly at the same inclination as the side portions from a top free edge 44 which defines the bottom edge of the hook opening to a bottom end of the lower flange portion which is fixed by welding to the outer ends of the two bottom flanges. The bottom flanges 26 are joined to the lower flange portion 40 spaced below the top free edge 44 thereof but in close proximity thereto due to the overall height of the lower flange portion 40 corresponding to approximately twice the vertical thickness of the bottom flanges.

The horizontal dimension of the bottom flanges between the base and the lower flange portion is greater than the similar dimension of the top flange, however the horizontal dimension remains near to or slightly less than the minimum distance between the free end of the strap hook and the opposing strap portion of the strap hook. In this instance, locating the free end of the hook adjacent the bottom retainer edge 42 of the upright retainer flange portion permits the base portion of the strap hook to be located outside of the lower flange portion when manually manipulated to allow ready removal of the strap hook from the retainer 10 even when the retainer is constructed with all of the flange portions thereof remaining fixed relative to one another.

To further ensure that the strap hook remains readily releasable while being automatically retained within the retainer even when slack is present in the strap, the dimensions of the hook opening 34 and surrounding flanges are suitably arranged as described in the following.

The height of the opening 34 between the bottom retainer edge 42 of the upright retainer flange 38 and the top free edge 44 of the lower flange portion 40 is arranged to be less than the height of the hook portion from the free end to the base portion of the strap hook. The outward offset of the top edge of the lower flange portion relative to the retainer edge of the upright retainer flange portion 38 thereabove defines a suitable supporting surface on the bottom flanges below the retainer edge upon which the base portion of the strap hook can be supported when slack is present in the strap. Accordingly the vertical height between the bottom flanges and the bottom retainer edge 42 of the upright retainer flange portion 38 thereabove is also arranged to be less than the height of the hook portion between the free end of the base portion of the strap hook so that the free end of the strap hook remains retained between the upright retainer flange portions 38 and the base of the retainer when the base portion of the strap hook is supported on the bottom flanges. The outward offset of the top free edge 44 relative to the bottom retainer edge 42 ensures that lowering of the strap hook from an engaged position results in the base portion being retained within the retainer housing between the lower flange portion and the base rather than sliding down to the outer side of the lower flange portion 40 as is required to be manually manipulated when it is desired to release the strap hook from the retainer.

Figure 7:
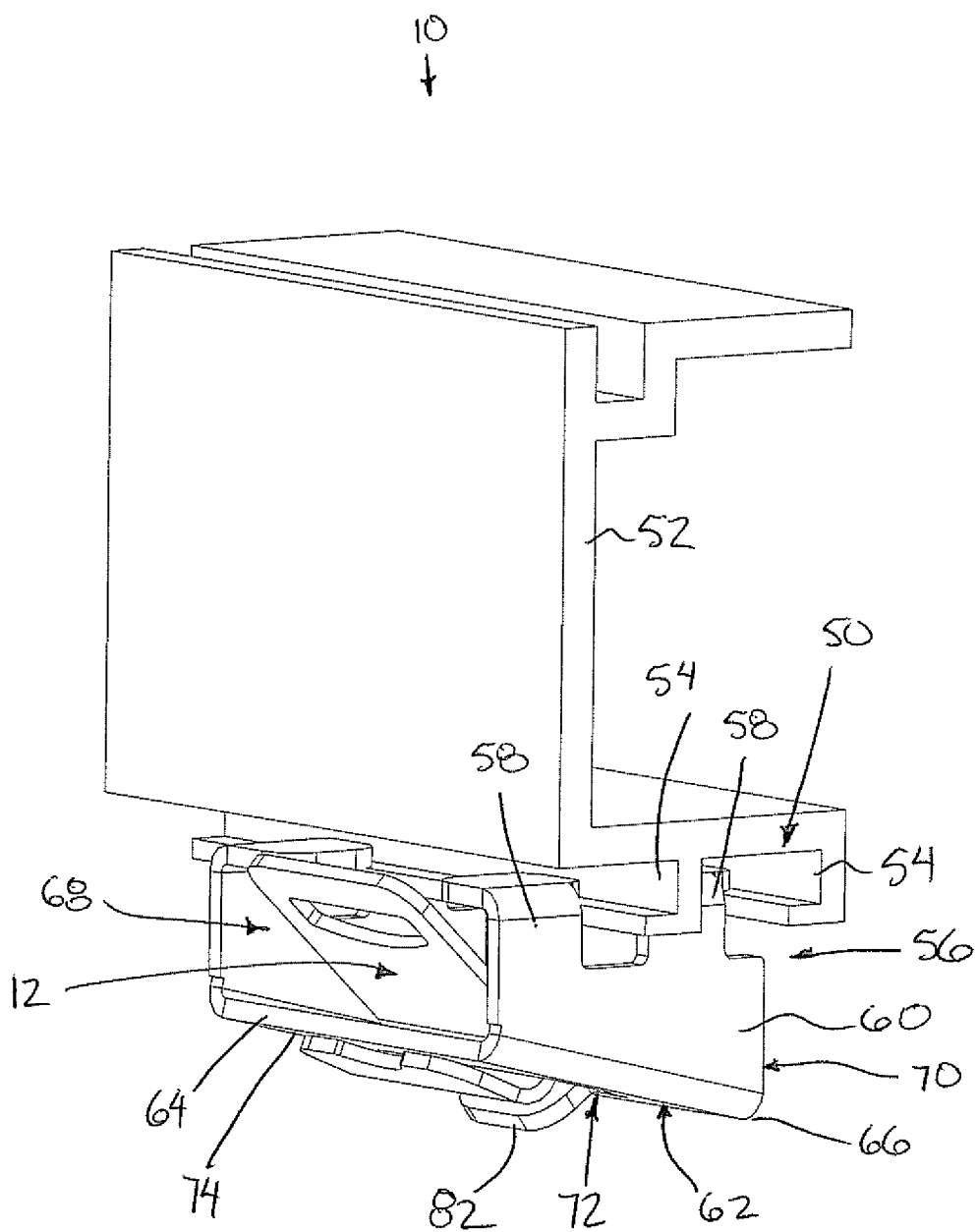
FIG. 7 is a perspective view of a further embodiment of the strap hook retainer supported on a track of a platform and receiving a strap hook therein.
Figure 8:
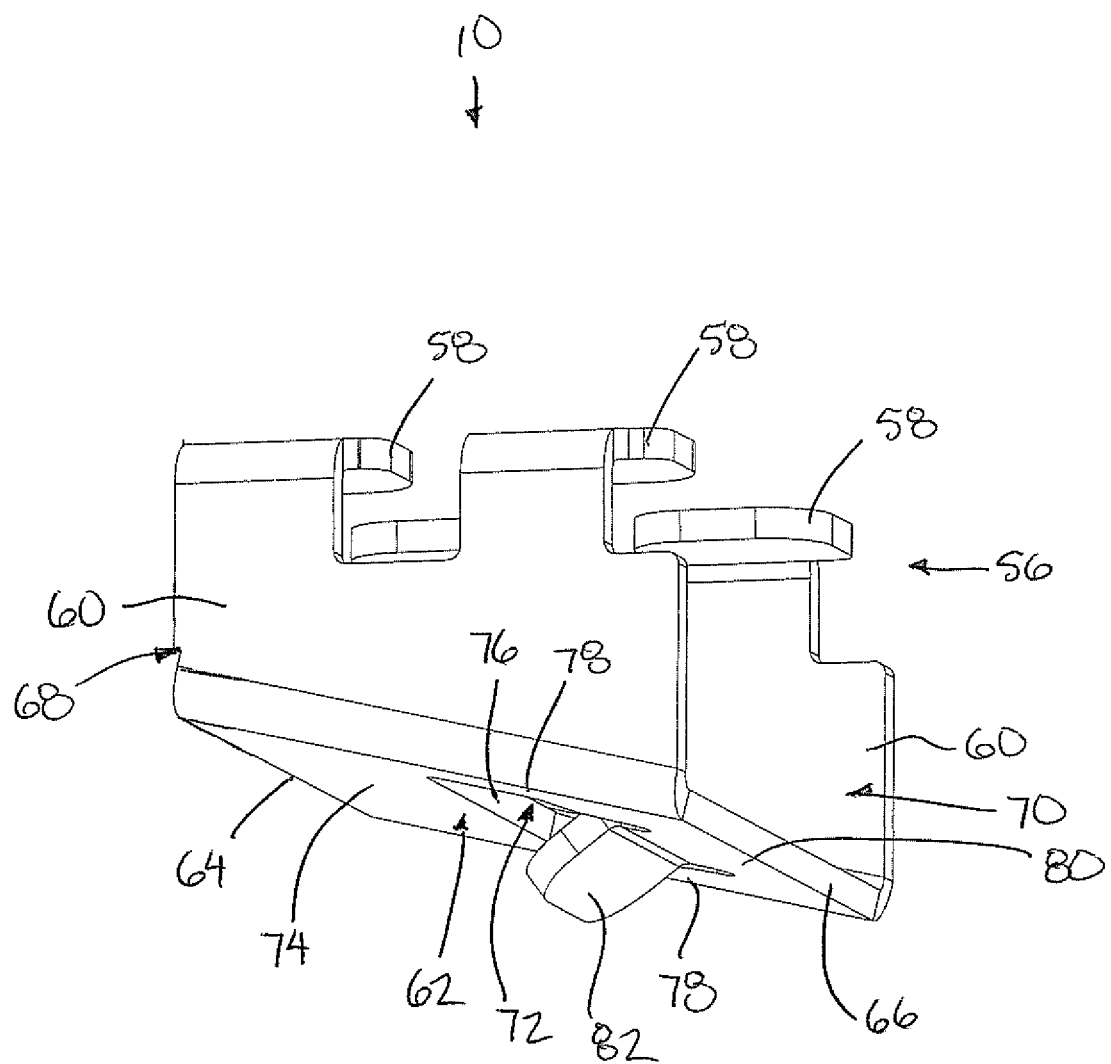
FIG. 8 is a perspective view of an inner side of the retainer according to FIG. 7.
Figure 9:
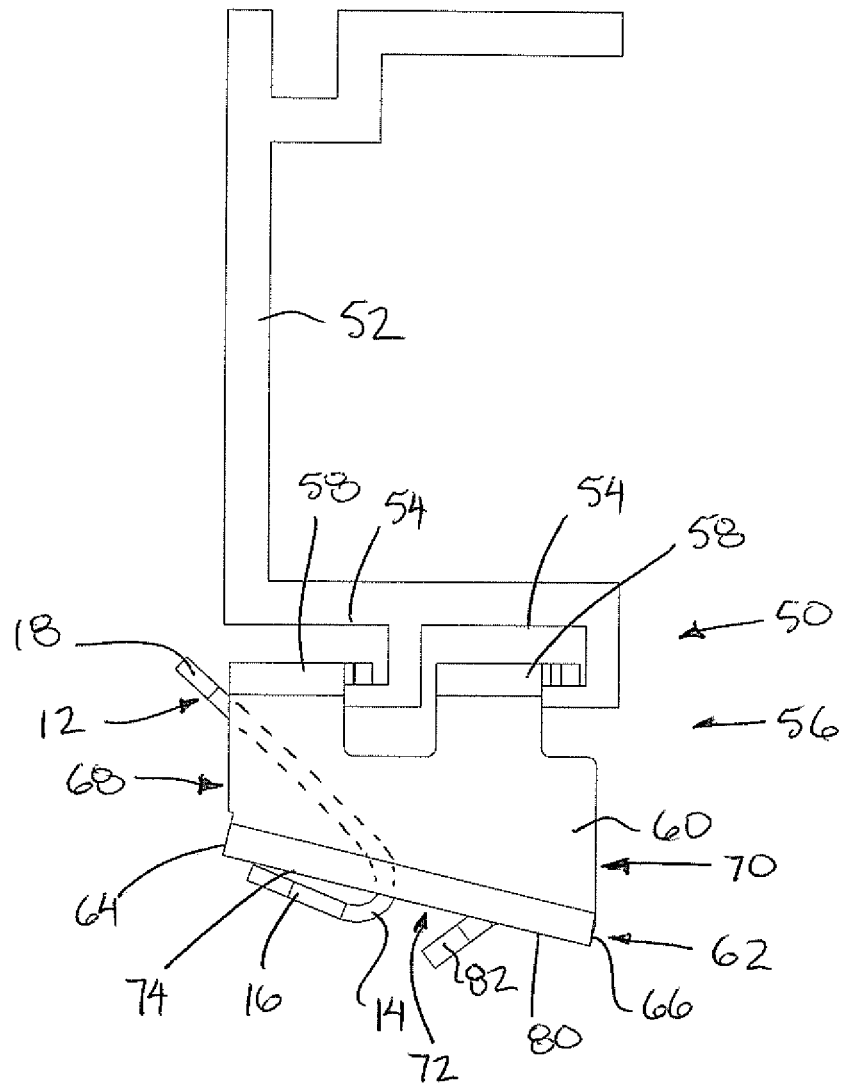
FIG. 9 is an end elevation view
Figure 10:
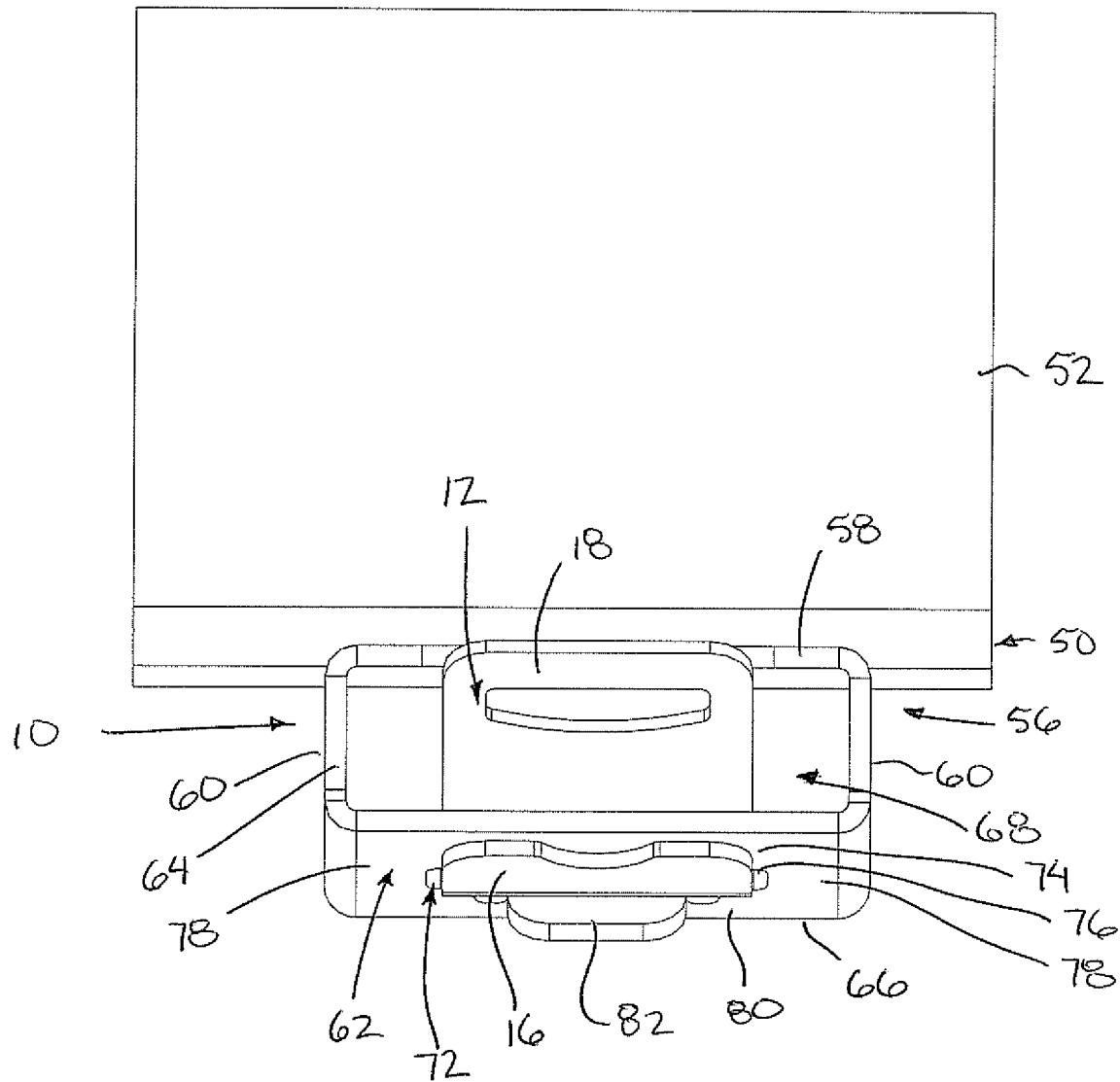
FIG. 10 is an outer side elevational view.
Figure 11:
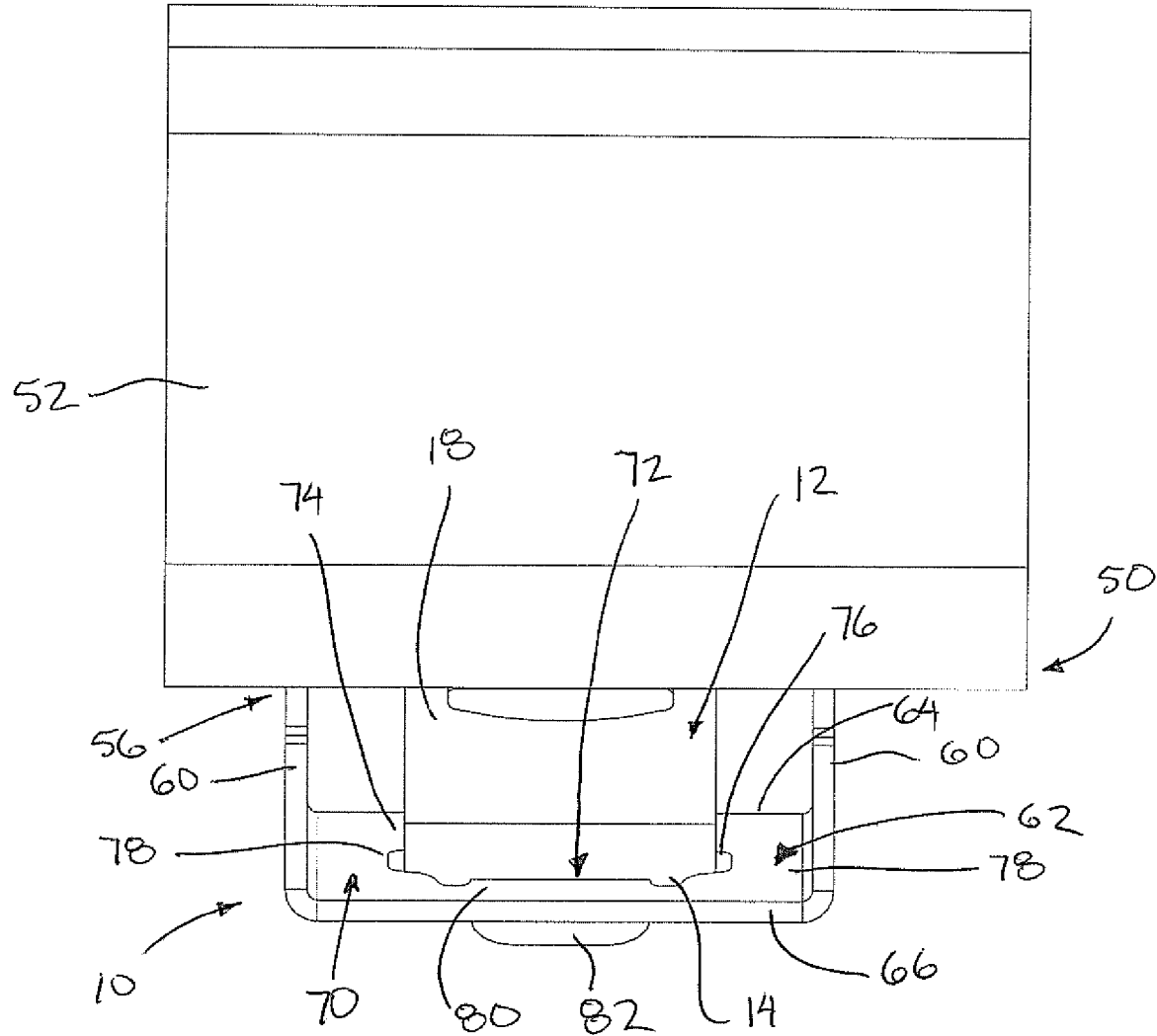
FIG. 11 is an inner side elevational view of the retainer according to FIG. 7 illustrating a strap hook retained therein.
Figure 12:
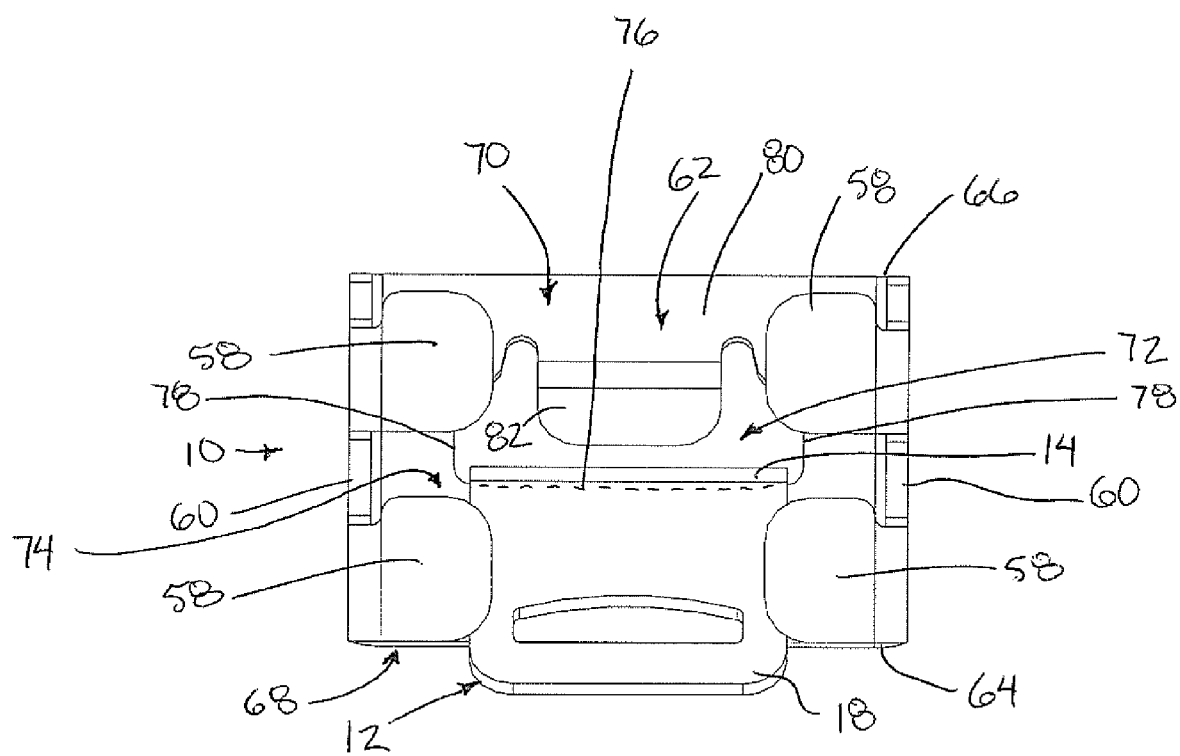
FIG. 12 and FIG. 13 are respective top plan and bottom plan views of the retainer according to FIG. 7 with a strap hook shown retained therein.
Figure 13:
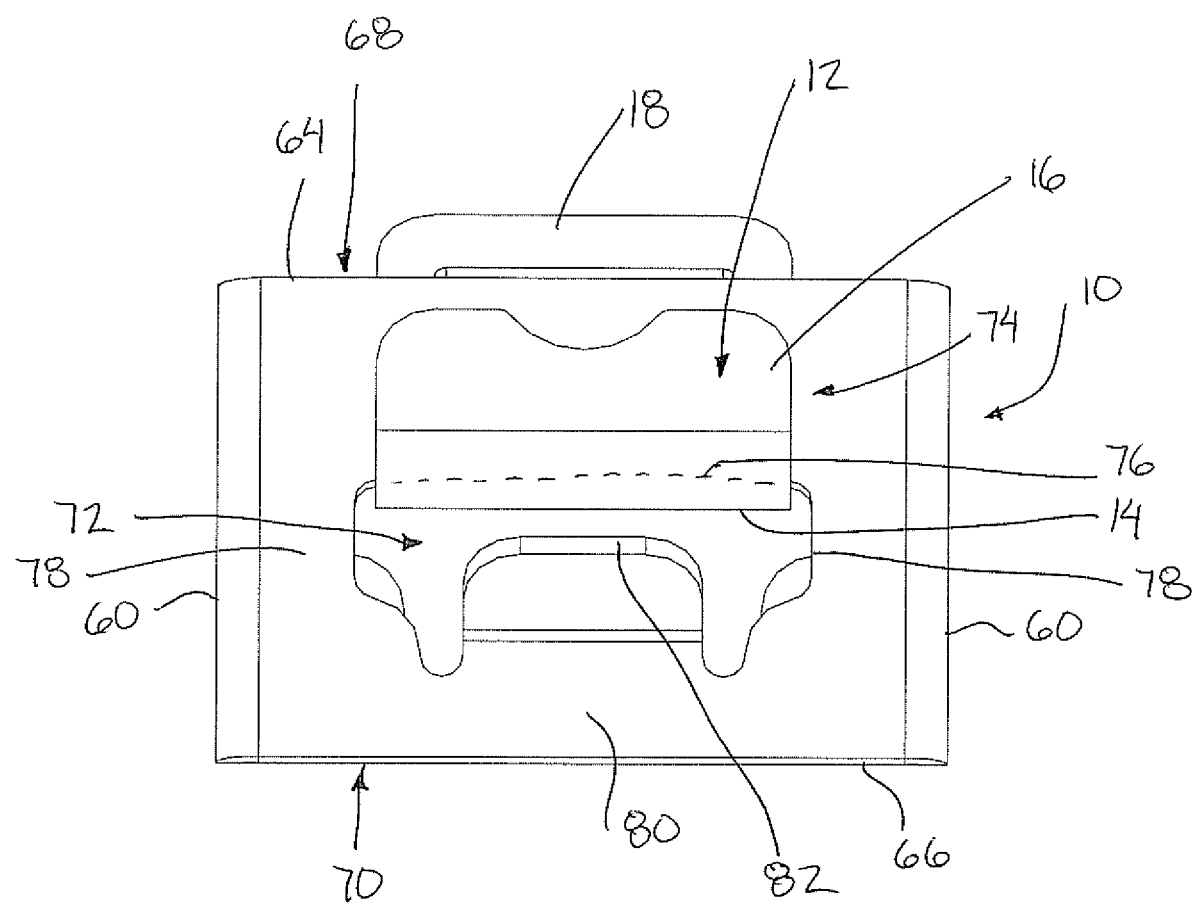

Referring now to FIGS. 7 through 13, a further embodiment of the strap hook retainer 10 is illustrated for use with a platform of the type having a track 50 extending alongside the platform within which the retainer 10 is arranged to be slidably mounted in the longitudinal direction of the platform. The platform typically comprises a side rail 52 extending along the length of one side of the platform which locates a pair of channels 54 formed in the underside thereof of suitable profile to slidably receive portions of the retainer 10 therein in mating connection for sliding in the longitudinal direction.

The retainer 10 in this instance comprises a base 56 arranged for mounting to the side rail of the platform in which the base comprises a plurality of guides 58 slidably received within respective ones of the channels 54. The guides 58 comprise two guide members supported at each of the longitudinally opposed ends of the base of the retainer in which the two guide members are slidably received within the two channels 54 respectively.

At each end of the base there is provided an end wall 60 which supports the two guides 58 at the top end thereof. The two end walls 60 are parallel and spaced apart from one another in the longitudinal direction at opposing ends of the base so as to depend vertically downward from the track when the guides are slidably received within the track.

A plate member 62 is joined between the bottom ends of the two end walls 60 in which the plate member spans in the longitudinal direction between the two ends and is sloped downwardly and inwardly from an outer edge 64 at the outer side of the retainer to an inner edge 66 at the inner side of the retainer. The plate member 62 spans the full width of the end walls in the lateral direction between opposing upright inner and outer edges thereof.

The retainer remains fully open between the two end walls above the plate member 62 from a strap opening 68 at the outer side of the retainer to an inner opening 70 at the inner side of the retainer. The strap opening 68 spans the full width between the two end walls and a full height between the plate member 62 therebelow and the guide received in the track thereabove. The height of the strap opening 68 defined by the height of the end walls at the outer side of the retainer between the plate member 62 and the guides 58 is sufficiently greater than the strap hook and the strap attached thereto to receive the strap hook inserted therethrough from the outer side towards the inner side.

A hook opening 72 is provided at a generally central location within the plate member 62 so as to be centered in longitudinal direction between the end walls. The dimension of the hook opening in the longitudinal direction between opposing side edges thereof is near to but slightly greater than the width of the strap hook between the opposed U-shaped edges thereof.

The hook opening 72 in the plate defines a retainer flange portion 74 of the plate member between the outer edge 64 at the outer side and a retainer edge 76 which forms the outer perimeter edge of the hook opening 72 onto which the strap hook is arranged to be hooked in an engaged position of the strap hook in use.

The hook opening 72 further defines a pair of side portions 78 of the plate member 62 which extend along longitudinally opposing sides of the hook opening between the retainer flange portion 74 at the outer side and an inner flange portion 80 at an inner side of the retainer. The side portions 78 are joined integrally with the end walls at outer edges thereof while the inner edges of the two side portions 78 define the longitudinally opposed edges of the hook opening which receive the strap hook therebetween.

The inner flange portion 80 of the plate member 62 spans from the defined inner edge of the hook opening to the inner edge 66 of the plate member. The inner flange portion 80 is coplanar with the two side portions 78 and the retainer flange portion 74 of the plate member so that they all extend at a downward and inward incline from the outer side to the inner side of the retainer.

A stop flange portion 82 is integrally supported on the inner flange portion 80 at the inner edge of the hook opening so as to extend downwardly and laterally outward therefrom below the hook opening. Distance of the stop flange portion 82 from the inner edge of the hook opening to the free end of the flange forming the stop flange portion is near in dimension to a width of the strap hook from the free end to the opposing strap portion thereof.

In use a hook is inserted through the strap opening at the outer side of the retainer above the retainer flange portion 74 with the hook portion of the strap hook being in a downward projecting orientation from the strap portion so that once the hook portion is aligned with the hook opening, the hook portion can be inserted downwardly and outwardly through the hook opening with the stop flange providing support therebelow to prevent the hook from falling through the hook opening. The dimension of the hook opening between the inner retainer edge of the retainer flange portion and the stop flange portion is less than the height of the hook portion from the free end to the base portion of the strap hook so that the strap hook is supported at the strap portion on the top side of the retainer flange portion 74 while the base portion and hook portion of the strap hook are supported on the stop flange when slack is present in the strap. Subsequent tightening causes the strap hook to be slidably displaced upwardly and outwardly along the top side of the retainer flange portion of the plate member until the retainer edge is engaged into the strap hook by engagement with the inner side of the base portion of the strap hook in an engaged position with the strap under tension.

The retainer 10 according to the embodiment of FIGS. 7 through 13 is readily manufactured from a single sheet of material such that the retainer 10 comprises a single, continuous, integral and unitary body of sheet material which has been appropriately shaped and bent to define the various components of the retainer 10 described above. In particular the plate member is cut from sheet material with a central aperture therein which defines the hook opening and the stop flange projecting from the inner edge of the hook opening. The two end walls are integrally formed projecting from opposing ends of the plate member and bent in relation thereto to define the end walls. Similarly the two guides supported at the top end of each end wall are also cut as continuous extensions of the top end of the end walls with the outer portions thereof being suitably shaped and bent to define guides which are matingly received within the channels of the track. In this instance a single plate of sheet material can be formed to define the retainer flange portion, the two side portions, the inner flange portion, the stop flange, the end walls and the two guide members on each end wall.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A strap hook retainer in combination with a strap hook of a tie down strap for use in securing cargo onto a platform wherein the strap hook comprises a U-shaped member having a base portion extending between a strap portion arranged to be mounted on the tie down strap and being mounted at one end of the base portion and a hook portion comprising a free end and being mounted at the other end of the base portion, the strap hook retainer comprising:
   a base arranged for securement to the platform;
   an upright retainer flange portion which is mounted to the base adjacent a top end of the upright retainer flange portion so as to be fixed in relation to the base, the retainer flange portion extending downwardly from the top end to a bottom retainer edge arranged to be received between the strap portion and the hook portion of the U-shaped member of the strap hook in an engaged position of the strap hook;
   a lower flange portion mounted to the base in fixed relation to the base, the lower flange portion comprising a top free edge which is spaced below the bottom retainer edge;
   a hook opening having a fixed dimension defined between the bottom retainer edge of the upright retainer flange portion and the top free edge of the lower flange portion and having a height between the bottom retainer edge and the top free edge which is less than a height of the free end of the hook portion from the base portion of the strap hook; and
   the top free edge of the lower flange portion being offset laterally outwardly away from the base in relation to the bottom retainer edge of the upright retainer flange portion so as to define a supporting surface between the top free edge of the lower flange portion and the base which is arranged to support the base portion of the strap hook thereon when the tie down strap is slack.

2. The strap hook retainer according to claim 1 wherein the height of the hook opening between the bottom retainer edge of the top free edge is near to a height of the free end of the hook portion from the base portion of the strap hook such that the free end of the hook portion is in close proximity to the bottom retainer edge when the base portion is supported on the supporting surface between the top free edge of the lower flange portion and the base when the tie down strap is slack.

3. The strap hook retainer according to claim 1 wherein the upright retainer flange portion and the lower flange portion are joined by side portions along opposing sides of the hook opening, the retainer flange portion, the lower flange portion and the side portions comprising an integral and continuous plate of material locating the hook opening therein.

4. The strap hook retainer according to claim 3 wherein the side portions are sloped at an outward and downward inclination from the bottom retainer edge of the retainer flange portion to the top free edge of the lower flange portion.

5. The strap hook retainer according to claim 1 wherein a horizontal distance of the offset of the top free edge of the lower flange portion relative to the bottom retainer edge of the retainer flange portion is less than a minimum distance between the free end and the strap portion of the strap hook.

6. The strap hook retainer according to claim 1 wherein the lower flange portion is upright in orientation and wherein there is provided a bottom flange spanning between the lower flange portion and the base which defines the supporting surface upon which the base portion of the strap hook is arranged to be supported when the tie down strap is slack.

7. The strap hook retainer according to claim 6 wherein the bottom flange is spaced below the top free edge of the lower flange portion.

8. The strap hook retainer according to claim 6 wherein a height between the bottom retainer edge and the bottom flange is less than the height of the free end of the hook portion from the base portion of the strap hook.

9. The strap hook retainer according to claim 1 wherein the base comprises a vertical plate member including mounting apertures arranged to receive mounting fasteners therethrough.

10. The strap hook retainer according to claim 1 wherein there is provided a top flange spanning between the top end of the retainer flange portion and the base at a location spaced upwardly from the bottom retainer edge of the retainer flange portion by a distance which is greater than the height of the free end of the hook portion from the base portion of the strap hook.

11. A strap hook retainer in combination with a strap hook of a tie down strap for use in securing cargo onto a platform comprising a track extending alongside the platform wherein the strap hook comprises a U-shaped member having a base portion extending between a strap portion arranged to be mounted on the tie down strap and being mounted at one end of the base portion and a hook portion comprising a free end and being mounted at the other end of the base portion, the strap hook retainer comprising:
   a base comprising guides arranged for mating connection with the track such that the base is slidable along the track;
   a retainer flange portion mounted in fixed relation to the base at a location spaced below the guides of the base, the retainer flange spanning laterally inwardly from an outer edge to an inner retainer edge arranged to be received between the strap portion and the hook portion of the U-shaped member of the strap hook in an engaged position of the strap hook;
   the outer edge being spaced below the guides of the base so as to define a strap opening arranged to receive the U-shaped strap hook inserted therethrough between the retainer flange portion and the guides from the outer edge to the inner retainer edge of the retainer flange portion; and
   a stop flange portion mounted in fixed relation to the base at a location spaced below the guides and spaced inwardly from the inner retainer edge so as to define a hook opening between the stop flange portion and the inner retainer edge of the retainer flange portion arranged to receive the hook portion of the strap hook extending downwardly therethrough in the engaged position of the strap hook.

12. The strap hook retainer according to claim 11 wherein the hook opening has a dimension between the inner retainer edge of the retainer flange portion and the stop flange portion which is less than a height of the free end of the hook portion from the base portion of the strap hook.

13. The strap hook retainer according to claim 11 wherein the retainer flange portion comprises a plate member locating an aperture therein which defines the hook opening, an outer edge of the aperture defining the inner retainer edge of the retainer flange portion and an opposing inner edge of the aperture supporting the stop flange portion thereon.

14. The strap hook retainer according to claim 13 wherein the stop flange portion is integrally and continuously formed with the retainer flange portion from the plate member.

15. The strap hook retainer according to claim 13 wherein the stop flange portion extends downwardly and forwardly from the inner edge of the aperture defining the hook opening.

16. The strap hook retainer according to claim 11 wherein there is provided a pair of end walls extending upwardly from opposing ends of the retainer flange portion to a top end mounted on the guides of the base respectively.

17. The strap hook retainer according to claim 16 wherein the retainer flange portion, the stop flange portion and the pair of end walls comprise an integral unitary body formed as a continuous and bent sheet of material.

18. The strap hook retainer according to claim 17 wherein the guides are integrally formed from the sheet of material as a unitary body together with the retainer flange portion, the stop flange portion and the pair of end walls.

19. A strap hook retainer in combination with a strap hook of a tie down strap for use in securing cargo onto a platform comprising a track extending alongside the platform wherein the strap hook comprises a U-shaped member having a base portion extending between a strap portion arranged to be mounted on the tie down strap and being mounted at one end of the base portion and a hook portion comprising a free end and being mounted at the other end of the base portion, the strap hook retainer comprising:

a base comprising guides arranged for mating connection with the track such that the base is slidable along the track; and a retainer flange portion mounted in fixed relation to the base and spanning inwardly from an outer edge to an inner retainer edge arranged to be received between the strap portion and the hook portion of the U-shaped member of the strap hook in an engaged position of the strap hook;

the retainer flange portion being spaced below the guides of the base so as to define a strap opening between the retainer flange portion and the base which is arranged to receive the U-shaped strap hook inserted therethrough between the retainer flange portion and the base such that the inner retainer edge of the retainer flange portion is arranged to be retained in the engaged position within the U-shaped member of the strap hook when the tie down strap is slack.

* * * * *